United States Patent [19]

Dholakia

[11] 4,439,855

[45] Mar. 27, 1984

[54] CAPACITIVE PLAYBACK STYLUS

[75] Inventor: Anil R. Dholakia, East Windsor, N.J.

[73] Assignee: RCA Corporation, New York, N.Y.

[21] Appl. No.: 292,285

[22] Filed: Aug. 12, 1981

[51] Int. Cl.³ .............................................. G11B 9/06
[52] U.S. Cl. ................................... 369/126; 369/151; 369/173
[58] Field of Search ............... 369/126, 150, 151, 170, 369/173

[56] References Cited

U.S. PATENT DOCUMENTS

| | | | |
|---|---|---|---|
| 2,992,007 | 7/1961 | Bondley | 369/173 |
| 4,104,832 | 8/1978 | Keizer | 51/281 R |
| 4,162,510 | 7/1979 | Keizer | 358/128 |
| 4,164,755 | 8/1979 | Matsumoto | 358/128 |
| 4,165,560 | 8/1979 | Matsumoto | 29/630 R |

FOREIGN PATENT DOCUMENTS 56-68939  6/1981  Japan .................................. 369/151

Primary Examiner—Alan Faber
Attorney, Agent, or Firm—Birgit E. Morris; Donald S. Cohen; Joseph D. Lazar

[57] ABSTRACT

A playback stylus for a capacitive information disc comprising a shank, a dielectric material at one end of the shank, a first conical region of a first angle in an end portion of the dielectric material, a second conical region adjacent to the first conical region of a second angle less than the first angle, and an information recovering terminal region in the first conical region for recovering information recorded in an information track of a capacitive information disc.

7 Claims, 4 Drawing Figures

CAPACITIVE PLAYBACK STYLUS

This invention relates to a capacitive information disc playback stylus and a method for its preparation.

BACKGROUND OF THE INVENTION

A playback stylus which is employed to recover information recorded in a capacitive information disc generally includes a dielectric support element. Often diamond is employed as the dielectric support element because of its long-wearing capabilities although other materials such as sapphire may also be employed. In order to obtain playback styli at lower cost, the dielectric suppport element may be mounted on a shank of a less costly material including a metal such as titanium.

Playback styli may be manufactured by employing a dielectric support element having a conical surface at one end. For example, Matsumoto in U.S. Pat. Nos. 4,164,755 and 4,165,560 discloses a pick-up stylus fabricated from a tapered diamond support element having a plurality of conical portions with a common axis. Two of the conical portions are separated by an electrode bearing surface. A record engaging surface is provided in the tip region substantially orthogonal to the electrode bearing surface. The support element includes a pair of converging flat surfaces in the tip region which are disposed such that the intersection of the converging flat surfaces with the record engaging surface defines the side edges of the record engaging surface. The intersection of the converging flat surfaces with a conical portion remote from the electrode bearing surface forms a prow.

In a copending application of Dholakia entitled, "Flip-Flop Grinding Method", Ser. No. 292,284, filed Aug. 12, 1981, a method for manufacturing a playback stylus with two faces having substantially the same area is disclosed.

Miller in a copending application, which is being filed concurrently, entitled, "Video Disc Stylus", Ser. No. 292,058, filed Aug. 12, 1981, discloses a capacitive information disc playback stylus in which two flats are lapped in a conical tip of a dielectric support element and a portion of the conical tip serves as the electrode bearing surface.

Dholakia in a copending application entitled, "Playback Stylus and its Manufacture," Ser. No. 292,057, filed Aug. 12, 1981, discloses a method of manufacturing a playback stylus from a conical tip in which an electrode bearing surface is lapped in the terminating portion of a conical tip.

In the aforementioned copending applications of Dholakia and Miller a signal recovering terminating portion which includes a record engaging surface is formed in the tip. One terminating signal recovering portion often employed is disclosed in Keizer, U.S. Pat. Nos. 4,104,832 and 4,162,510 in which a keel-tipped playback stylus and a method for forming the stylus are disclosed. The terminating portion of the tip is shaped to have a prow, a substantially flat rear surface remote from prow, a pair of substantially parallel side surfaces extending from the side edges of the rear surface, a bottom surface extending from the bottom edge of the rear surface, and additional surfaces extending from the prow intersecting the bottom and side surfaces.

I have found a problem in employing the conical tip dielectric support element bonded to a shank in preparing a capacitive information disc playback stylus. Generally a conical angle of 40 to 60 degrees is employed; a conical angle used in the audio stylus art. Attempts have been made to employ such audio styli in the manufacture of capacitive information disc playback styli. However, because of the increased amount of material that must be removed as a function of increasing conical angle when a signal recovering terminating portion such as a keel tip is prepared, a smaller conical angle, for example, 30 degrees, is preferred. However, the smaller conical angle results in a more fragile tip which readily breaks off. Also, attempts to prepare a stylus dielectric support element disc-engaging surface from this smaller conical angle results in a some of the shank portion being ground away. The shank material, such as titanium, poisons the abrasive lapping surface which results in a loss of abrasiveness with the concomitant need for longer lapping times and more frequent change of abrasive charge on the abrasive lapping surface. It would, therefore, be desirable to obtain a shanked dielectric support element having a small conical angle without the drawbacks I have observed.

SUMMARY OF THE INVENTION

I have found a method of preparing a capacitive information disc playback stylus from an element comprising a shank having a dielectric material at one end. The method includes the steps of grinding a first cone of a first angle in the end portion of the dielectric material, grinding a second cone of a second angle less than the first angle in the body of the dielectric material adjacent to end portion, and forming an information recovering terminal portion in a region of the first cone for recovering information recorded in a capacitive information disc.

I have also found a capacitive information playback stylus comprising a shank, a dielectric material at one end of the shank, a first conical region of a first angle in a portion of the dielectric material, a second conical region adjacent to the first conical region with the second angle less than the first angle, and an information recovering terminal region in the first conical region for recovering information recorded in an information track in a capacitive information disc.

DETAILED DESCRIPTION OF THE INVENTION

Figure 1:
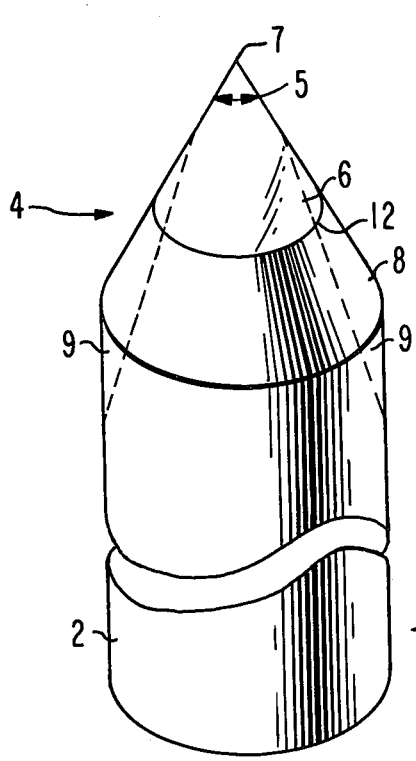
FIG. 1 is a perspective view of a stylus element having a first conical region.

The invention will be illustrated by means of the Drawing. However, it is to be understood that the scope of the invention is not meant to be limited to the details described therein.

FIG. 1 is a perspective view of a stylus element 10 having a shank 2 and a conical tip region 4 having a first conical angle 5. The shank 2 material may be, for example, a metal such as titanium. The first conical tip region 4 may consist of two components 6 and 8, wherein the first tip region component 6 terminates at tip end 7 and is generally a hard dielectric material such as diamond, sapphire, and the like. The second tip region component 8 may be fabricated, for example, from the same material as the shank 2 material.

The interface 12 between the second tip region component 8 and the first tip region component 6 is shown for the case with the first and second tip region component 6 and 8, respectively, are fabricated from different materials. The two tip component regions 6 and 8 may be bonded at the interface 12 by brazing, soldering, or any other suitable method known to the art. A reference flat, not shown, may be machined into the stylus element 10 along the shank 2 to orient the stylus element. The border of the unwanted region 9 to be removed in order to obtain the stylus element 10 of the desired structure is shown by the interrupted lines.

Figure 2:
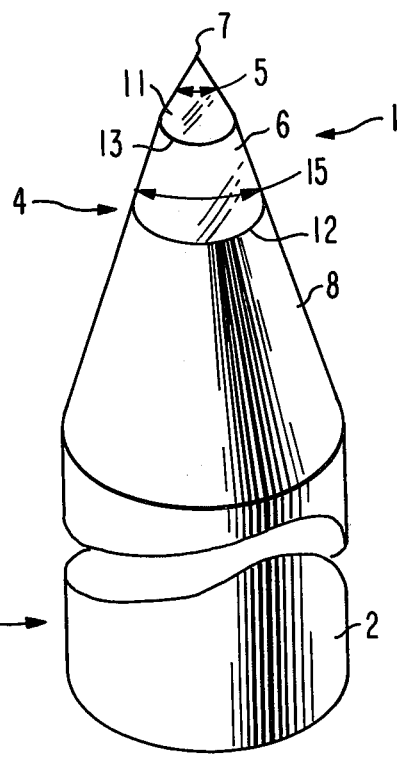
FIG. 2 is a perspective view of a stylus element having a first conical region and a second conical region.

FIG. 2 is a perspective view of a stylus element 10 in which a the conical tip region 4 has a first conical tip region portion 11 having a first conical angle 5 and a second conical tip region portion 17 having a second conical angle 15, after the unwanted region 9 has been removed. The second conical angle 15 is less than that of the first conical angle 5. The conical tip the region portions 11 and 17 may be formed by any method known in the art such by grinding or a diamond particle charged abrasive surface. The major axes of the first conical tip region portion 11 and the second conical tip region portion 17 may be the same. One or both of the major axes may be substantially the same as the major axis of the shank, as shown in FIG. 2. The border 13 separates the first conical region portion 11 from the second conical region portion 17.

Figure 3:
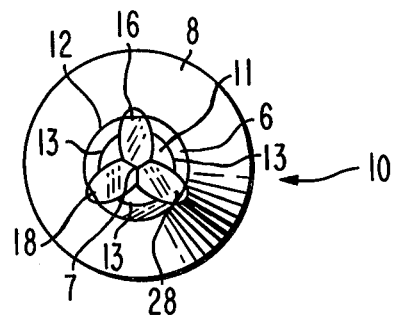
FIG. 3 is a frontal view of a tip of a stylus element of the present invention after two flats and an electrode surface have been lapped.

FIG. 3 is a frontal view of the stylus element 10 after the lapping operations to form a first flat 18, a second flat 28, and an electrode surface 16 have been completed. The stylus element may now be further lapped to provide an information recovering terminal portion which includes a disc engaging surface, for example, a flat orthogonal to the electrode surface 16 or a keel tip.

Illustratively, the first flat 18 and the second flat 28 are of substantially the same area and make an angle of about 20 degrees with the common major axis of the first conical tip region portion 11, the second conical tip region portion 17 and the shank. The electrode surface 16 may be made conductive, for example, by evaporating a metal such as titanium, hafnium and the like, or by ion implantation of boron cations. The electrode surface 16 makes an angle of about 20 degrees with the common major axis. The angle between the electrode surface 16 and either the first flat 18 or the second flat 28 is 70 degrees.

The present invention may be employed to prepare the styli for use for either a grooved or non-grooved capacitive information disc. The present invention may be employed with the flip-flop grinding method of the aforementioned copending application of Dholakia to lap two faces of substantially equal dimensions into the second conical surface. The method of Dholakia in which an electrode face is lapped into the conical surfaces followed by the fabrication of a disc engaging terminating portion may also be employed. Alternatively, the teachings of the copending application of Miller in which two flats are lapped and the curved surface which is a portion of the conical surfaces serves as the electrode surface may also advantageously employ the present invention.

Figure 4:
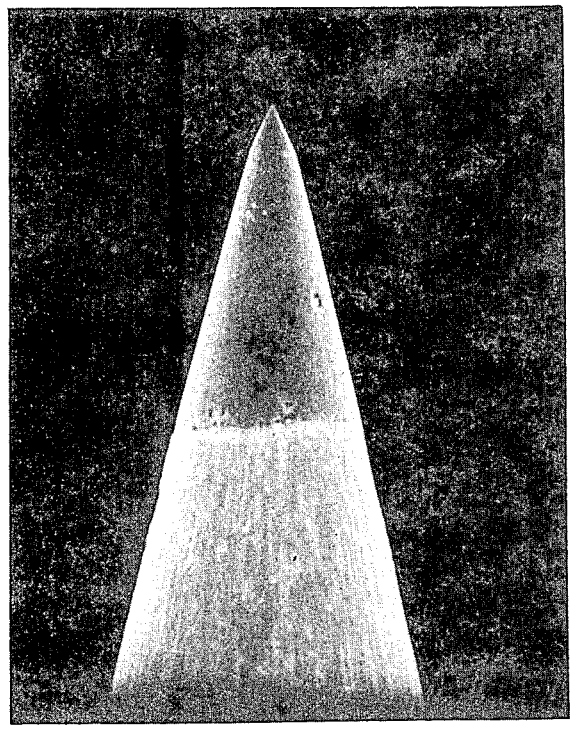
FIG. 4 is a photomicrograph of a stylus element of the present invention.

FIG. 4 is an electron micrograph at a magnification of 200X of a stylus element in which a second conical tip region portion 17 has been lapped adjacent to the first conical tip region portion 11. A diamond dielectric support element having a height of 250 micrometers is brazed onto a 0.1 inch (0.254 centimeter) long, 0.012 inch (0.03 millimeter) diameter titanium shank. The second conical tip region portion 17 has a second conical angle 15 of 30 degrees. The first conical tip region portion 11 has a height of 0.001 inch (25.4 micrometers) and a first conical angle 5 of 50 degrees.

I claim:

1. A capacitive information disc playback stylus comprising:
    a shank;
    a dielectric support element at one end of the shank;
    a first conical region of a first angle within the range of 40 to 60 degrees in a portion of the dielectric support element, said first conical region terminating at a constricted tip;
    a second conical region adjacent to the first conical region and to the shank of a second angle less than the first angle, said second angle being about 30 degrees; and
    an information recovery terminal region in the first conical region for recovering information recorded in an information track of a capacitive information disc wherein said region is a keel tip.

2. A stylus in accordance with claim 1 wherein the dielectric support element is bonded to the shank.

3. A stylus in accordance with claim 1 wherein the dielectric support element is made of diamond.

4. A stylus in accordance with claim 1 where the shank comprises titanium.

5. A stylus in accordance with claim 1 wherein the first conical region and the second conical region have a common major axis.

6. A stylus in accordance with claim 5 wherein the major axis of the first conical region and the second conical region is substantially the same as the major axis of the shank.

7. A stylus in accordance with claim 1 wherein said first conial region is about 25 micrometers in height from said tip to said second conical region, and said second region is about 225 micrometers in height from said first conical region to said shank.

* * * * *